US008885043B2

(12) United States Patent
Lin et al.

(10) Patent No.: US 8,885,043 B2
(45) Date of Patent: Nov. 11, 2014

(54) MONITORING SYSTEM AND IMAGE RECONSTRUCTION METHOD FOR PLANTING BED

(75) Inventors: Ta-Te Lin, Taipei (TW); Tai-Hsien Ou-Yang, Taipei (TW); Chang-Chih Liu, Taipei (TW); Tsung-Cheng Lai, Taipei (TW)

(73) Assignee: National Taiwan University, Taipei (TW)

( * ) Notice: Subject to any disclaimer, the term of this patent is extended or adjusted under 35 U.S.C. 154(b) by 517 days.

(21) Appl. No.: 13/349,897

(22) Filed: Jan. 13, 2012

(65) Prior Publication Data

US 2013/0141589 A1 Jun. 6, 2013

(30) Foreign Application Priority Data

Dec. 1, 2011 (TW) .............................. 100144223 A

(51) Int. Cl.
*H04N 7/18* (2006.01)
*G06K 9/00* (2006.01)

(52) U.S. Cl.
USPC ........................................................ 348/143

(58) Field of Classification Search
CPC .. H04N 7/181; G06K 9/00657; G06T 7/0002; G06T 7/0075; G06T 2207/30188; G06T 2200/32; G06T 2207/30128
USPC ....... 348/607; 47/33; 382/106, 110; 345/419; 340/605; 702/127, 159
See application file for complete search history.

(56) References Cited

U.S. PATENT DOCUMENTS

| | | | |
|---|---|---|---|
| 6,281,801 B1 * | 8/2001 | Cherry et al. ................. | 340/605 |
| 6,348,918 B1 * | 2/2002 | Szeliski et al. ................ | 345/419 |
| 6,754,370 B1 * | 6/2004 | Hall-Holt et al. ............. | 382/106 |
| 8,615,374 B1 * | 12/2013 | Discenzo ....................... | 702/127 |
| 2010/0030515 A1 * | 2/2010 | Kludas et al. ................. | 702/159 |
| 2011/0019096 A1 * | 1/2011 | Lee et al. ....................... | 348/607 |

* cited by examiner

*Primary Examiner* — Young Lee
*Assistant Examiner* — Salame Amr
(74) *Attorney, Agent, or Firm* — WPAT, PC; Justin King

(57) ABSTRACT

An image reconstruction method adapted to use with a planting bed is provided. The planting bed is constituted by a work platform disposed on a work plane and for supporting a plurality of plants thereon. The image reconstruction method includes steps of: capturing a plurality of images of the work platform from different positions on a monitoring plane to obtain a plurality of image data, wherein the monitoring plane is opposite to the work plane, the monitoring and work planes are parallel to each other in a visible range and have a predetermined distance therebetween; and performing an image stitching algorithm to stitch the image data into a two-dimensional image of the planting bed. A monitoring system of a planting bed is also provided.

5 Claims, 3 Drawing Sheets

MONITORING SYSTEM AND IMAGE RECONSTRUCTION METHOD FOR PLANTING BED

TECHNICAL FIELD

The present invention relates to an image reconstruction method, and more particularly to an image reconstruction method adapted to use with a monitoring system for a planting bed.

BACKGROUND

Accurate panoramic image reconstruction for planting beds and non-destructive measurement for plant appearances are the two important technologies that the analyses of biological resources and agricultural crops largely rely on. The panoramic images of planting beds and the plant appearances can provide the plant height, leaf area, and other features, which can be used for the establishment of plant growth models so as to create an appropriate environment for the plant growth and increase the crop yield and quality. In addition, the establishment of plant growth models also helps research institutions to explore the factors which may affect the crop growth so as to improve the crop cultivation and help to understand the interactions between plants and environments.

Plants in the existing plant factories are usually planted with a high density and the planting beds therein usually have layers with a small height, so the observation view for plants is seriously limited and accordingly the observations and the measurements for plants are not easily performed by labor work. Today, some plant factories use a mechanical manner, such as using cameras, to observe and measure the growth of plants; however, these cameras usually are installed to fixed locations and thereby only limited plants can be monitored by the cameras. Thus, the observations and measurements of plants realized by the fixed cameras are difficult to have a high efficiency and an automatic manner.

SUMMARY OF EMBODIMENTS

Therefore, one object of the present invention is to provide a monitoring system of a planting bed for monitoring the growth condition of the plants on the planting bed.

Another object of the present invention is to provide an image reconstruction method for reconstructing two-dimensional and three-dimensional images of a planting bed.

The present invention provides a monitoring system adapted to use with a planting bed. The planting bed is constituted by a work platform disposed on a work plane and for supporting a plurality of plants thereon. The monitoring system includes a supporting bracket, a sliding module, an image capture apparatus and an analysis unit. The supporting bracket is disposed on the working platform for defining a monitoring plane opposite to the work plane. The monitoring and work planes are parallel to each other in a visible range and have a predetermined distance therebetween. The sliding module is supported by the supporting bracket and includes a sliding structure capable of sliding on the monitoring plane in a predetermined direction. The image capture apparatus is installed to the sliding structure for capturing a plurality of images of the work platform from different positions on the monitoring plane and thereby obtaining a plurality of image data while the sliding structure is driven to slide in the predetermined direction. The analysis unit is signal connected to the image capture apparatus. The analysis unit is configured to perform an image stitching algorithm to stitch the image data into a two-dimensional image of the planting bed, the analysis unit is further configured to obtain a plurality of height data of the different positions on the work platform according to parallaxes between the images of the work platform captured from different positions on the monitoring plane and perform a stereo vision algorithm on the two-dimensional (2D) image of the planting bed and the height data to obtain a three-dimensional (3D) image of the planting bed.

The present invention further provides an image reconstruction method adapted to use with a planting bed. The planting bed is constituted by a work platform disposed on a work plane and for supporting a plurality of plants thereon. The image reconstruction method includes steps of: capturing a plurality of images of the work platform from different positions on a monitoring plane to obtain a plurality of image data, wherein the monitoring plane is opposite to the work plane, the monitoring and work planes are parallel to each other in a visible range and have a predetermined distance therebetween; and performing an image stitching algorithm to stitch the image data into a two-dimensional image of the planting bed.

In an embodiment of the present invention, the image reconstruction method further includes steps of: obtaining a plurality of height data of different positions on the work platform according to parallaxes between the images of the work platform captured from different positions on the monitoring plane; and performing a stereo vision algorithm on the two-dimensional image of the planting bed and the height data to obtain a three-dimensional image of the planting bed.

Therefore, once the two-dimensional and three-dimensional images of a planting bed are obtained and further performed by the noise removing, the planting bed features identification and the spatial distortion correction, some plant characteristics, such as the plant height, leaf area or volume can be measured so as to compute and analyze the plant growth models and thereby creating an appropriate environment for the plant growth and increasing the crop yield and quality. Besides, these measured plant characteristics can be further used in the environment control for plant growth, plant growth management, plant physiology, yield assessment and quality testing.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1:
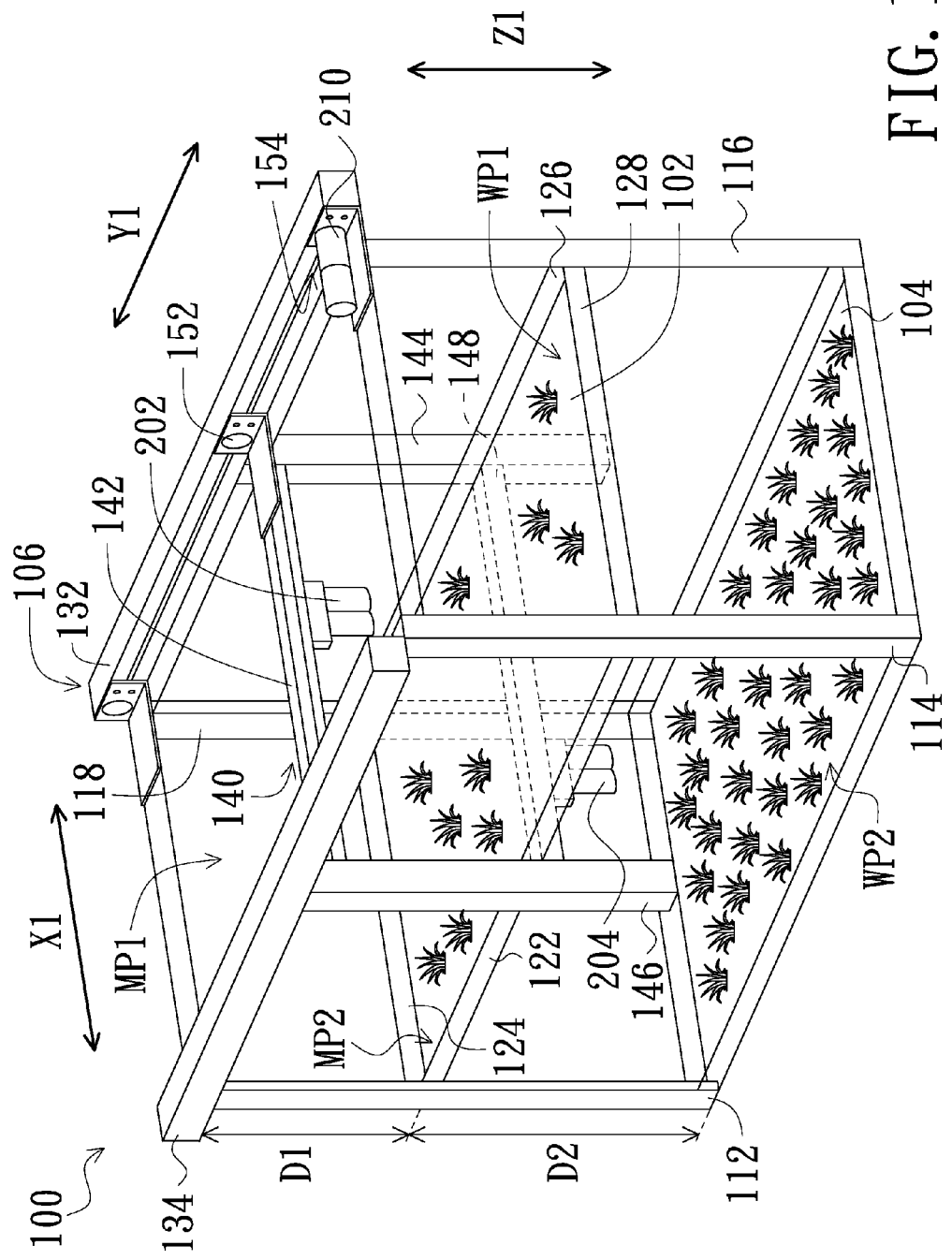
FIG. 1 is a three-dimensional structure view of a planting bed in accordance with an embodiment of the present invention.

FIG. 1 is a three-dimensional (3D) structure view of a planting bed in accordance with an embodiment of the present invention. As shown, the planting bed 100 includes a work plane WP1 and a monitoring plane MP1 opposite to the work plane WP1. On the work plane WP1, a work platform 102 is disposed to support plants. Moreover, in this embodiment, the monitoring plane MP1 and the work plane WP1 are, without a limitation, parallel to each other in a visible range.

The planting bed 100 may have a multi-layer or a single-layer structure. To get a clear understanding of the present invention, the planting bed 100 is exemplified by a multi-layer (specifically, a two-layer) structure. Accordingly, the planting bed 100 has two work planes WP1, WP2 defined at two different heights, two work platforms 102, 104 respectively disposed on the two work planes WP1, WP2, and two monitoring planes MP1, MP2 respectively opposite to the two work planes WP1, WP2; it is noted that the monitoring plane MP2 and the work plane WP1 are actually defined at a same plane. In addition, the work plane WP1 and the corresponding monitoring plane MP1 have a predetermined distance D1 therebetween; the work plane WP2 and the corresponding monitoring plane MP2 have a predetermined distance D2 therebetween; and the predetermined distances D1, D2 are not necessary to have a same value.

To make the description of the present invention concise and neat, hereafter only one layer of the two-layer structure, constituted by the work plane WP1, work platform 102 and monitoring plane MP1, in the planting bed 100 will be used for the illustration of the present invention. However, those ordinarily skilled in the art can easily develop a planting bed with a multi-layer structure from a single-layer structure based on the following description.

As shown in FIG. 1, the planting bed 100 further includes a supporting bracket, which is constituted by first supporting rods 112, 114, 116 and 118 and second supporting rods 122, 124, 126 and 128. The first supporting rods 112, 114, 116 and 118 are arranged to extend in a predetermined direction Z1. The second supporting rod 122, 124, 126 and 128 are disposed on the work plane WP1 and around the work platform 102 so as to support the work platform 102 on the work plane WP1. In addition, the second supporting rods 122, 124, 126 and 128 each are disposed to connect two adjacent first supporting rods; for example, the second supporting rod 122 two ends thereof are connected to the two adjacent first supporting rods 112, 114, respectively.

As shown in FIG. 1, in particular, the planting bed 100 of this embodiment further includes at least one monitoring platform 106. The monitoring platform 106 includes at least one sliding track 132, which is disposed on the monitoring plane MP1, extending in a predetermined direction Y1, and supported by the first sliding rods 116, 118; wherein the predetermined direction Y1 is generally perpendicular to the predetermined direction Y1. In this embodiment, the sliding track 132 is, for example, an electrical sliding track and includes a moving part 152 and a groove 154. The groove 154 extends in the predetermined direction Y1, and the moving part 152 is engaged and movable in the groove 154. And thus, the moving part 152 can slide forwardly and backwardly in the predetermined direction Y1 along the groove 154.

In addition, the monitoring platform 106 further includes a sliding structure 140, which is capable of sliding along the sliding track 132. Specifically, the sliding structure 140 at least includes a primary sliding part 142. The primary sliding part 142 is disposed on the monitoring plane MP1, extending in a predetermined direction X1, and one end thereof connected to the moving part 152 of the sliding track 132; wherein the predetermined direction X1 is generally perpendicular to each of the predetermined directions Y1, Z1. Therefore, through a driving of the moving part 152, the sliding structure 140 as well as the primary sliding part 142 can slide forwardly and backwardly in the predetermined direction Y1 along the sliding track 132.

An image capture apparatus 202 is installed to the primary sliding part 142. And thus, the image capture apparatus 202 can capture images of the work platform 102 on the work plane WP1 from different positions on the monitoring plane MP1 while the primary sliding part 142 is driven by the moving part 152 to slide forwardly and backwardly in the predetermined direction Y1.

It is noted that the sliding structure 140 further includes a pair of connecting part 144, 146 and at least one secondary sliding part 148 if the planting bed 100 has a multi-layer structure. In this embodiment, the connecting parts 144, 146 are respectively connected to the two ends of the primary sliding part 142, and the connecting parts 144, 146 each extend roughly in the predetermined direction Z1. The secondary sliding part 148 is generally disposed on the monitoring plane MP2, extending in the predetermined direction X1, and two ends of which respectively connected to the connecting parts 144, 146. Therefore, the secondary sliding part 148 as well as the connecting parts 144, 146 are also driven to simultaneously slide along the sliding track 132 while the primary sliding part 142 is driven by the moving part 152.

An image capture apparatus 204 is installed to the secondary sliding part 148. And thus, the image capture apparatus 204 can capture images of the work platform 104 on the work plane WP2 from different positions on the monitoring plane MP2 while the secondary sliding part 148 is driven by the moving part 152 to slide forwardly and backwardly in the predetermined direction Y1. In this embodiment, the image capture apparatuses 202, 204 are, for example, Charge-Coupled Device (CCD) cameras, Complementary Metal-Oxide Semiconductor (CMOS) cameras or other types of image/video recording devices.

In some other embodiments, the monitoring platform 106 further includes another sliding track 134 functioning as a secondary sliding track. The sliding track 134 is also disposed on the monitoring plane MP1, extending in the predetermined direction Y1, and supported by the first supporting rods 112, 114, the ones from the first supporting rods are not connected to the sliding track 132. Similarly, the primary sliding part 142 can slide along the sliding track 134; in other words, while the primary sliding part 142 a first end of which is driven by the moving part 152 of the sliding track 132 to slide forwardly and backwardly in the predetermined direction Y1, simultaneously a second end of the primary sliding part 142 also slides forwardly and backwardly in the predetermined direction Y1 along the sliding track 134.

Figure 2:
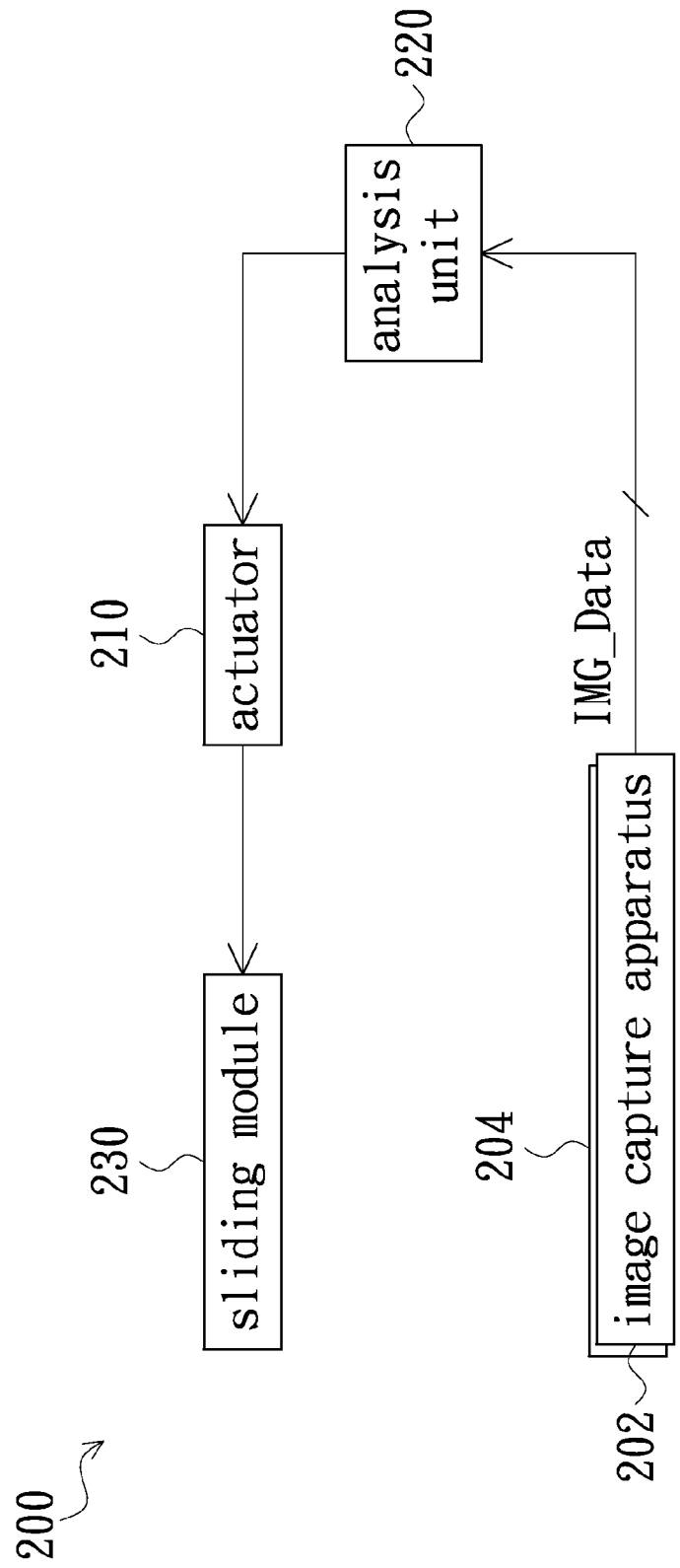
FIG. 2 is a block view of a monitoring system in accordance with an embodiment of the present invention.

FIG. 2 is a block view of a monitoring system, which is a combination of the mechanical part of the monitoring platform 106 and the electrical part of the planting bed 100, in accordance with an embodiment of the present invention. Please refer to FIGS. 1, 2, the monitoring system 200 includes an image capture module (exemplarily constituted by the image capture apparatuses 202, 204), an actuator 210, an analysis unit 220 and a sliding module 230, which is constituted by the sliding structure 140 and the sliding tracks 132, 134. The actuator 210, implemented with a motor and electrically connected to the sliding module 230, is configured to drive the moving part 152 of the sliding track 132 to move forwardly and backwardly in the predetermined direction Y1.

In addition, the image capture apparatuses 202, 204 are signal connected to the analysis unit 220.

The analysis unit 220 can be, without a limitation, a desktop computer, a portable computer, or a smart handheld device; or the analysis unit 220 can be simply implemented with a single chip, a microprocessor or a processor chip. In some embodiments, the analysis unit 220 is electrically connected to the actuator 210; and through a control from the analysis unit 220, the actuator 210 drives the sliding structure 140 to slide forwardly and backwardly in the predetermined direction Y1.

Figure 3:
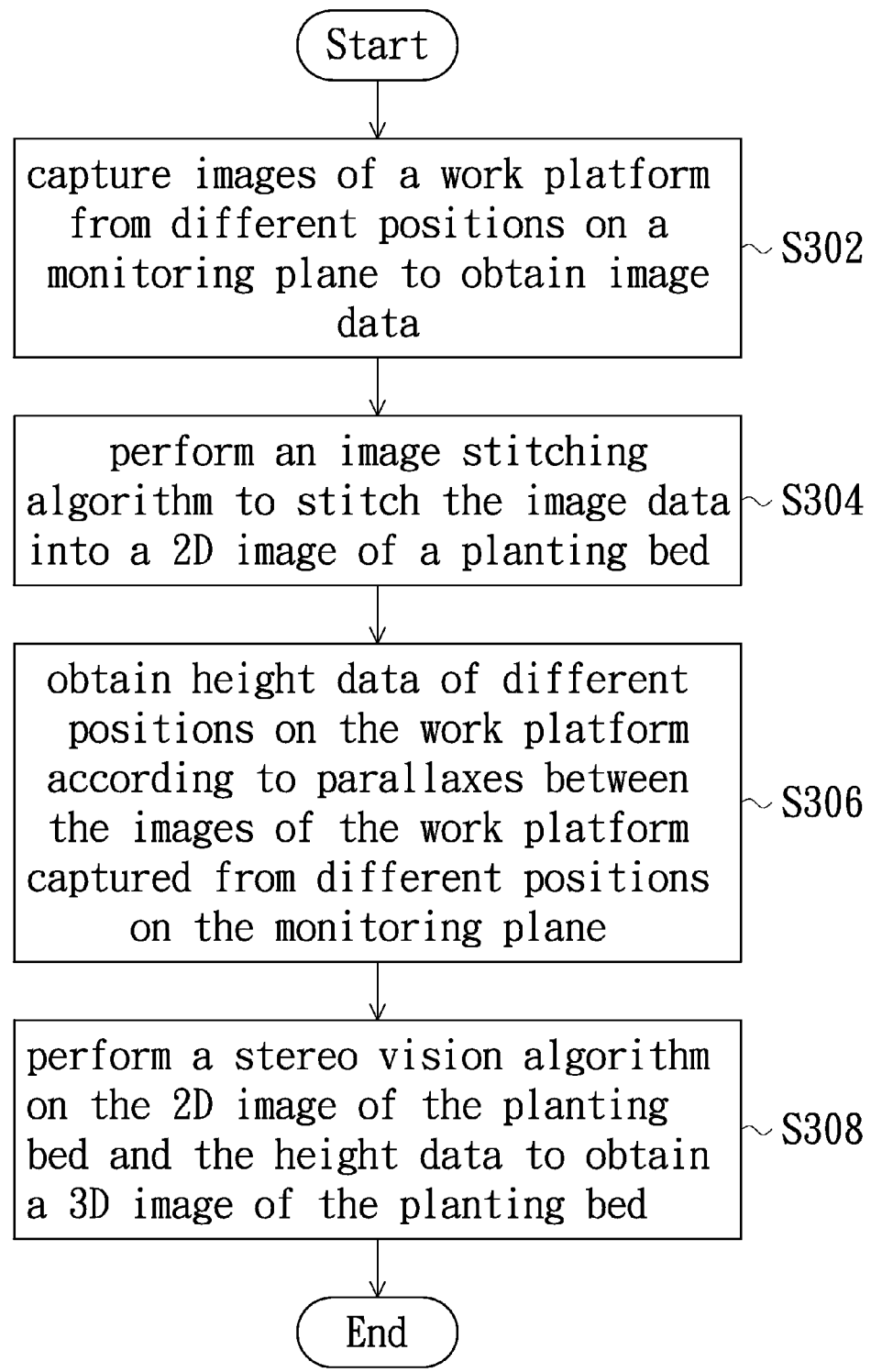
FIG. 3 is a flow chart of an image reconstruction method for a planting bed in accordance with an embodiment of the present invention.

FIG. 3 is a flow chart of an image reconstruction method for a planting bed in accordance with an embodiment of the present invention. Please refer to FIGS. 1, 2 and 3. Firstly, the image capture apparatuses 202, 204, while the sliding structure 140 slides forwardly and backwardly along the predetermined direction Y1, respectively capture images of the work platforms 102, 104 from different positions on the monitoring planes MP1, MP2 so as to generate a plurality of image data IMG_Data (step S302). Afterward, these image data IMG_Data are transmitted to the analyzing unit 220, and the analysis unit 220 performs the image stitching algorithm to stitch these image data IMG_Data into a two-dimensional (2D) image of the planting bed 100.

Then, based on the parallaxes between the images of the work platforms WP1, WP2 respectively captured from different positions on the monitoring planes MP1, MP2, the analysis unit 220 obtains a plurality of height data of different positions on the work platforms WP1, WP2 (step S306). Afterward, the analysis unit 220 performs the stereo vision algorithms to analyze the two-dimensional image of the planting bed 100 and these height data so as to obtain a three-dimensional image of the planting bed 100 (step S308).

In summary, the monitoring system and the image reconstruction method for a planting bed disclosed in the present invention have at least the following characteristics:

1. A plurality of images of a work platform are captured by an image capture apparatus, which is disposed in a monitoring system of a planting bed, from different positions on a monitoring plane so as to obtain a plurality of image data, and then a two-dimensional image of the planting bed is obtained by performing an image stitching algorithm on the image data.

2. A plurality of height data of different positions on the work platform are obtain based on parallaxes between the images of the work platform captured from different positions on the monitoring plane. A three-dimensional image of the planting bed is then obtained through performing a stereo vision algorithm on the two-dimensional image of the planting bed and the height data.

Therefore, once the two-dimensional and three-dimensional images of a planting bed are obtained and further performed by the noise removing, the planting bed features identification and the spatial distortion correction, some plant characteristics, such as the plant height, leaf area or volume can be measured so as to compute and analyze the plant growth models and thereby creating an appropriate environment for the plant growth and increasing the crop yield and quality. Besides, these measured plant characteristics can be further used in the environment control for plant growth, plant growth management, plant physiology, yield assessment and quality testing.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A monitoring system adapted to use with a planting bed, the planting bed being constituted by a work platform disposed on a work plane and for supporting a plurality of plants thereon, the monitoring system comprising:
   a supporting bracket disposed on the working platform for defining a monitoring plane opposite to the work plane, wherein the monitoring and work planes are parallel to each other in a visible range and have a predetermined distance therebetween;
   a sliding module supported by the supporting bracket and comprising a sliding structure capable of sliding on the monitoring plane in a predetermined direction;
   an image capture apparatus installed to the sliding structure for capturing a plurality of images of the work platform from different positions on the monitoring plane and thereby obtaining a plurality of image data while the sliding structure is driven to slide in the predetermined direction; and
   an analysis unit signal connected to the image capture apparatus;
   wherein the analysis unit is configured to perform an image stitching algorithm to stitch the image data into a two-dimensional image of the planting bed, the analysis unit is further configured to obtain a plurality of height data of the different positions on the work platform according to parallaxes between the images of the work platform captured from different positions on the monitoring plane and perform a stereo vision algorithm on the two-dimensional image of the planting bed and the height data to obtain a three-dimensional image of the planting bed.

2. The monitoring system according to claim 1, wherein the image capture apparatus is either a still image camera or a video recorder.

3. The monitoring system according to claim 1, wherein the analysis unit is a desktop computer or a portable computer.

4. The monitoring system according to claim 1, wherein the analysis unit is a smart handheld device.

5. The monitoring system according to claim 1, wherein the analysis unit is a software product.

* * * * *